US010841492B2

(12) United States Patent
Kanarek

(10) Patent No.: US 10,841,492 B2
(45) Date of Patent: Nov. 17, 2020

(54) DATA COMMUNICATION ON AUXILIARY POWER PORTS ON A SMART BATTERY PACK FOR VIDEO CAMCORDERS AND DSLR CAMERAS

(71) Applicant: Core SWX, LLC, Plainview, NY (US)

(72) Inventor: Ross Kanarek, Great Neck, NY (US)

(73) Assignee: CORE SWX, LLC, Plainview, NY (US)

( * ) Notice: Subject to any disclaimer, the term of this patent is extended or adjusted under 35 U.S.C. 154(b) by 249 days.

(21) Appl. No.: 15/977,745

(22) Filed: May 11, 2018

(65) Prior Publication Data

US 2019/0141242 A1 May 9, 2019
US 2020/0296283 A9 Sep. 17, 2020

Related U.S. Application Data

(63) Continuation-in-part of application No. 15/808,849, filed on Nov. 9, 2017, now abandoned, which is a continuation-in-part of application No. 14/683,584, filed on Apr. 10, 2015, now Pat. No. 10,197,630.

(51) Int. Cl.
*H04N 5/232* (2006.01)
*G03B 17/56* (2006.01)
*G06F 13/42* (2006.01)

(52) U.S. Cl.
CPC .......... *H04N 5/23241* (2013.01); *G03B 17/56* (2013.01); *G06F 13/4282* (2013.01); *G06F 2213/0042* (2013.01)

(58) Field of Classification Search
CPC ............ H04N 5/23241; G06F 13/4282; G06F 2213/0042; G03B 17/56
See application file for complete search history.

(56) References Cited

U.S. PATENT DOCUMENTS

| 7,880,431 B2* | 2/2011 | Rayl | H01M 10/488 320/114 |
| 2016/0126758 A1* | 5/2016 | Wu | H02J 7/0031 320/162 |
| 2016/0299194 A1* | 10/2016 | Kanarek | G08C 17/02 |

* cited by examiner

*Primary Examiner* — Twyler L Haskins
*Assistant Examiner* — Angel L Garces-Rivera
(74) *Attorney, Agent, or Firm* — Robert J. Hess; Hess Patent Law Firm

(57) ABSTRACT

In connection with video production equipment, data communication is made available through battery pack ports other than the main power output. This availability enables, regardless of the device being utilized, knowledge as to the attributes and status of the power source of the battery pack and also access to information that may be stored in the battery pack. Auxiliary ports, such as a power tap port and a universal serial bus port, are equipped for establishing data communication between the battery pack and accessory devices.

19 Claims, 19 Drawing Sheets

DATA COMMUNICATION ON AUXILIARY POWER PORTS ON A SMART BATTERY PACK FOR VIDEO CAMCORDERS AND DSLR CAMERAS

CROSS-REFERENCE TO RELATED APPLICATIONS

This is a continuation-in-part of patent application Ser. No. 15/808,849 filed Nov. 9, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE

Not applicable.

BACKGROUND OF THE INVENTION

Battery packs, including smart battery packs, are used to provide power for professional camcorders or other video recording, lighting and larger monitoring devices "primary devices" used in video production. Professional or commercial video production utilize battery packs with v-mount and 3-stud attachment plates battery packs that may have auxiliary power ports "auxiliary ports" such as a powertap or "ptap" port to provide power for accessory devices which may include on-camera lighting, high definition video (HDV) camcorder and digital single lens reflex (DSLR) cameras, on-camera monitors/viewfinders and video producing accessories "accessory devices". In addition, the v-mount and 3-stud attachment plates may have a universal serial bus (USB) port which provides power for other accessory devices such as the accessory devices listed above or mobile devices including cellular phones, laptop computers, tablets, etc. The accessory devices may be used in the video production or for other purposes. For example, the USB port on professional v-mount and 3-stud battery packs offer a 5-volt output on the positive and negative power transmission lines of the standard USB connector.

Data communication between the battery pack and the devices used in video production, including cameras, video recorders and camcorders, is an important capability and feature to monitor the battery pack's remaining runtime.

At present, data communication is only available through the main power output of the battery pack. Furthermore, not all primary devices such as cameras, video recorders and camcorders used in the professional, commercial or personal video market are able to receive the battery data. Likewise, many smaller cameras, video recorders, and professional video accessories do not allow mounting of the v-mount or 3-stud attachment plates necessary to enable connection to the main power output.

Since data communication is only available on the main power output, such smaller cameras, video recorders, and professional video accessories do not provide for data communication with the smart battery regardless of its actual capability. The mechanical and/or design limitations preventing mounting the mating attachment plate of the battery pack directly to the primary device prevents data communication between the battery pack and the primary device i.e., the recorder. Likewise, there is no data communication between the battery pack and any accessory devices that may be connected to the auxiliary ports of the battery pack because data communication is only available through connection to the main power output of the battery pack.

Therefore, a method of providing for data communication between a battery pack and primary devices that are connected to that battery pack which is not limited by the mechanical and/or design limitations described above is needed.

BRIEF SUMMARY OF THE INVENTION

One aspect of the invention pertains to a novel and distinct use of a powertap port and a USB port of a smart battery pack used in professional video production. That is, such novel and distinct use is for data communication between the battery pack, any accessory device connected to the auxiliary ports and the primary devices to which the battery pack supplies power.

In accordance with the invention, data communication is made available through battery pack ports other than the main power output. This availability enables those involved in the video production regardless of the device being utilized not only to know the attributes and status of the power source, but also to have access to information that may be stored in the battery pack. Clearly, as one of ordinary skill in the relevant art would understand, the data that can be communicated in that sense can be limitless and assist in production in ways too numerous to list.

BRIEF DESCRIPTION OF THE SEVERAL VIEWS OF THE DRAWING

For a better understanding of the present invention, reference is made to the following description and accompanying drawings, while the scope of the invention is set forth in the appended claims.

DETAILED DESCRIPTION OF THE INVENTION

The invention includes an auxiliary power output port on a battery pack for professional video recording which also supports data transmission signals.

Figure 1B:
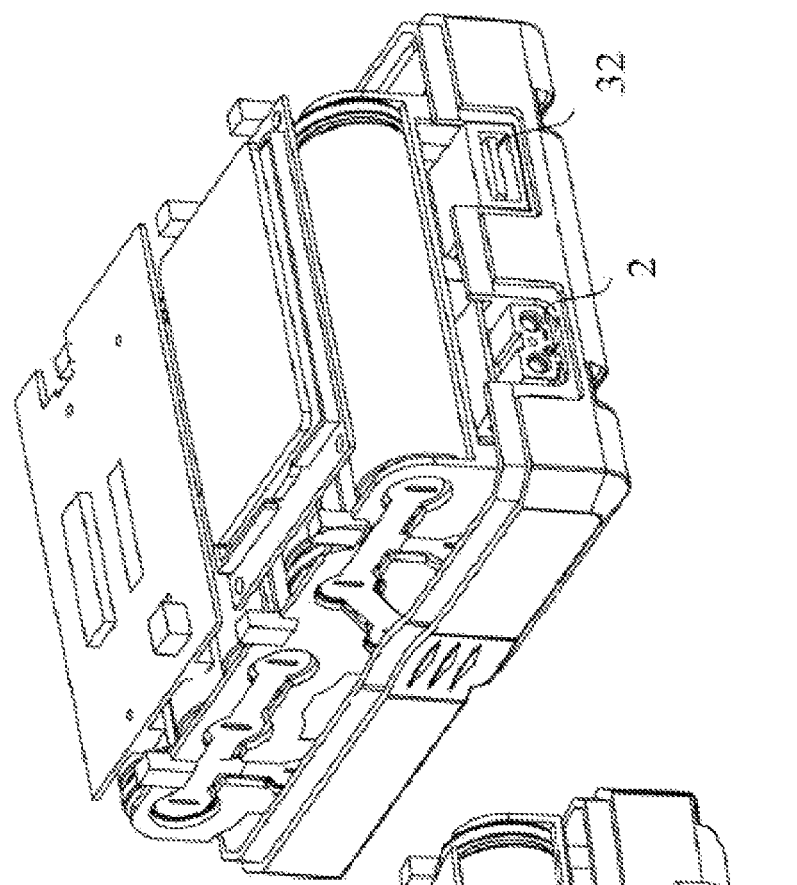
FIGS. 1A and 1B are isometric views that are rotated 180 degrees from each other of a conventional v-mount battery pack, which is used in video production, but which has a powertap port assembly in accordance with the invention.
Figure 1A:
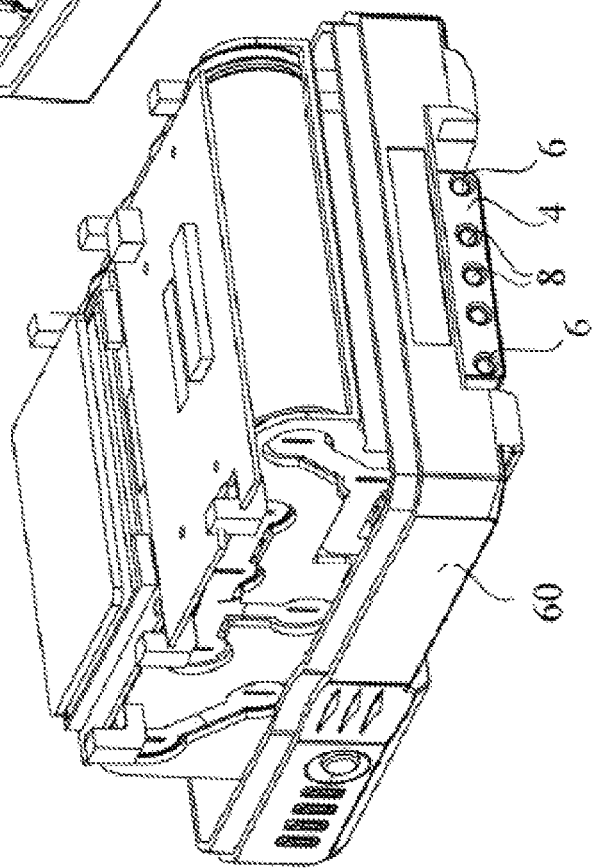
Figure 8:
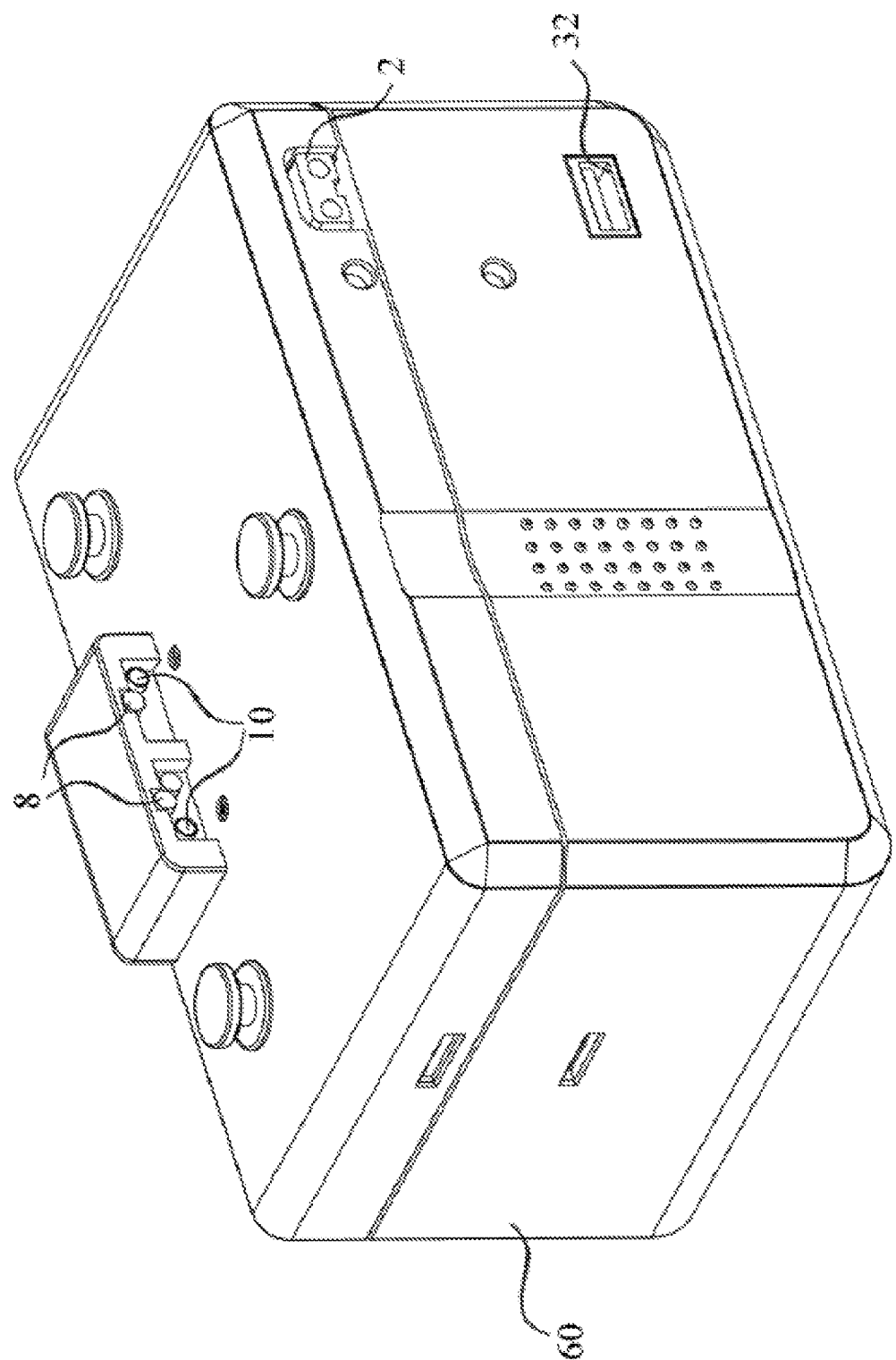
FIG. 8 is a perspective view of a conventional 3-stud battery pack, but which has a power tap port assembly in accordance with the invention.

FIGS. 1A, 1B and 8 each show a conventional battery pack 60 utilized in video production. The powertap or ptap port 2 and USB port 32 of FIGS. 1B and 8 are essential auxiliary power ports on v-mount and 3-stud battery packs for video production, typically for professional or commercial use. As shown in FIG. 1A, a main power output port 4 is on the battery pack 60 for a primary device such as a professional camcorder, camera or video recorder, which supports data transmission signals in addition to the transmission of power. The signal or signals are output so that transmission of the attributes and status of the battery is supported.

Figure 2:
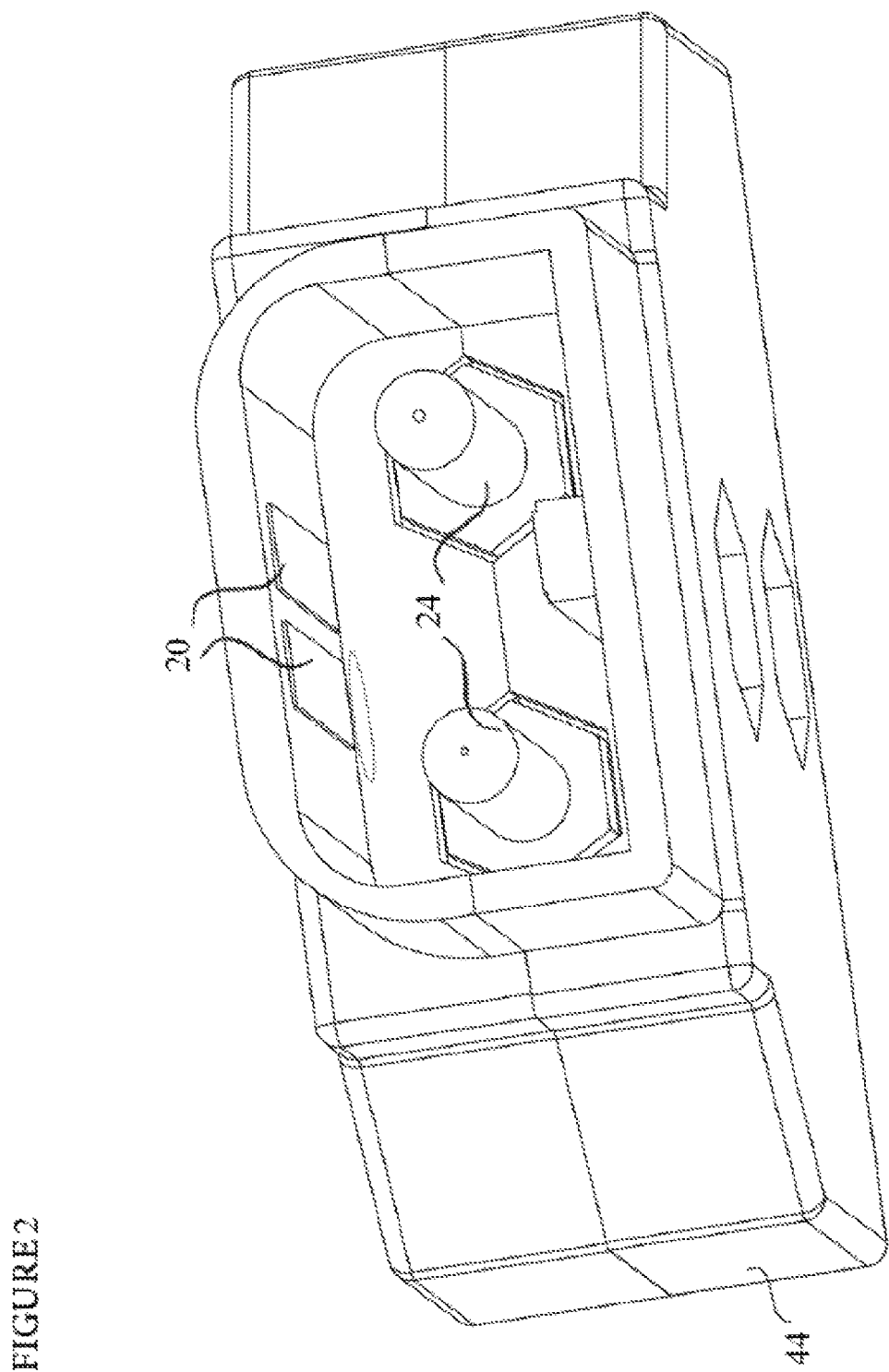
FIG. 2 is an isometric view of a powertap connector assembly in accordance with the invention.
Figure 3:
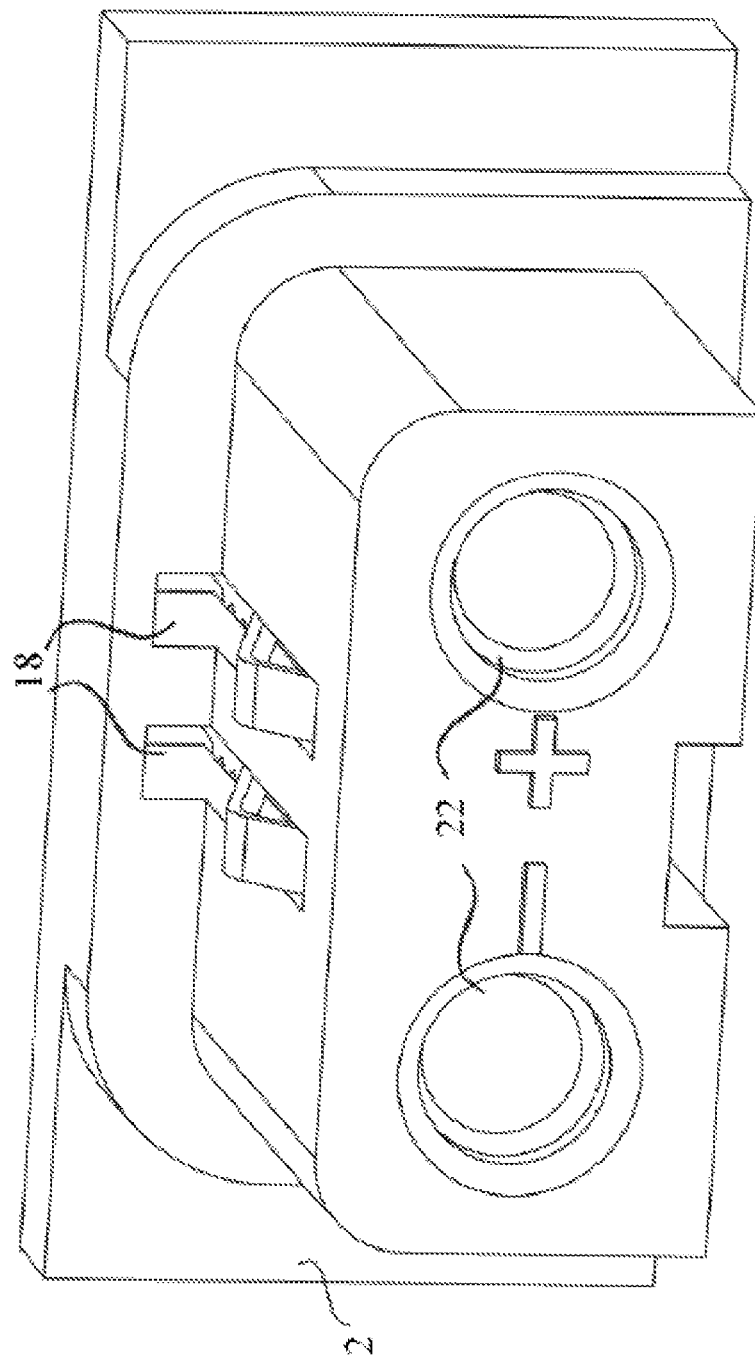
FIG. 3 is an isometric view of the powertap port assembly that supports data transmission.
Figure 4:
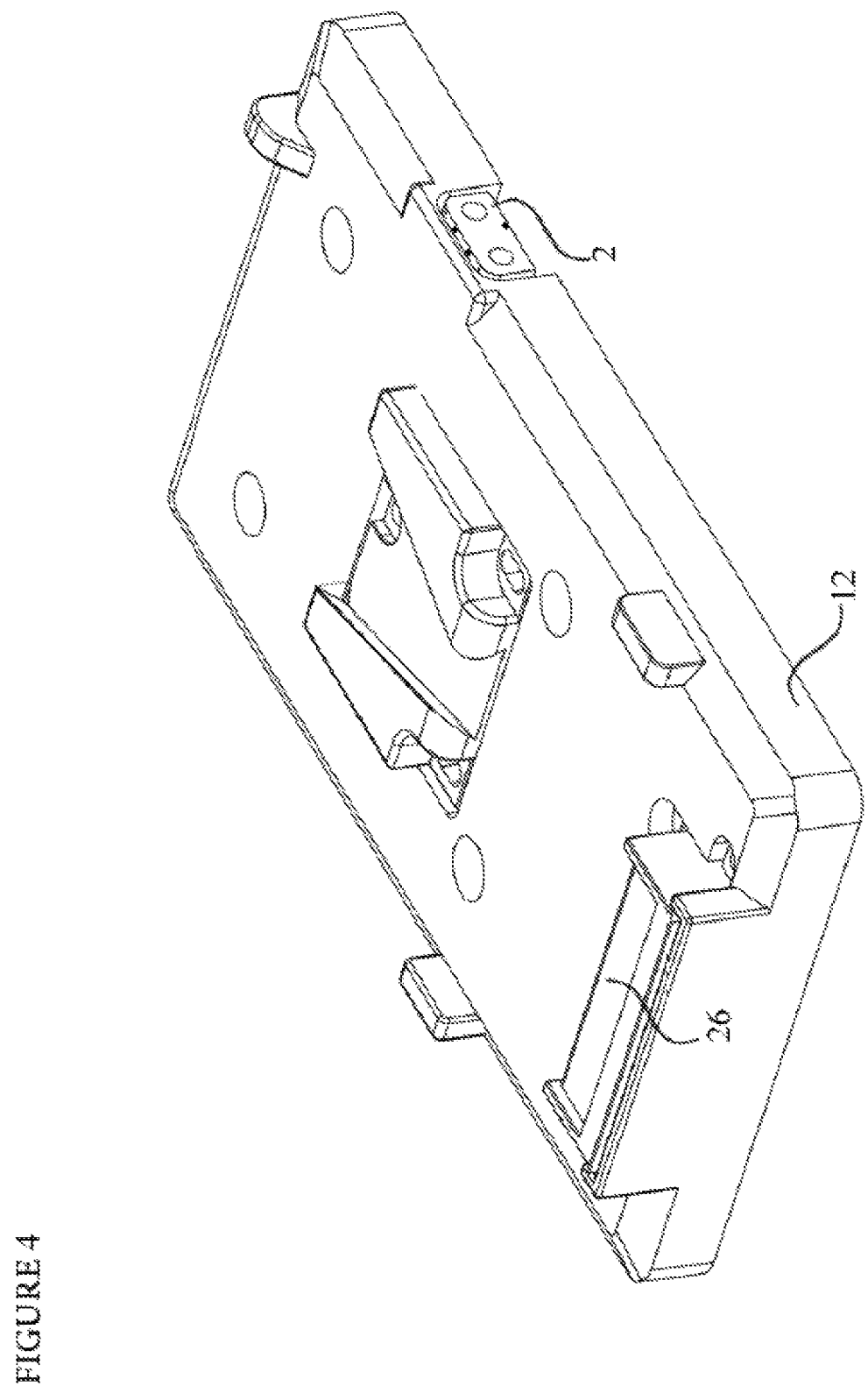
FIG. 4 is an isometric view of a conventional v-mount attachment plate, but which has a powertap port assembly in accordance with the invention.
Figure 5:
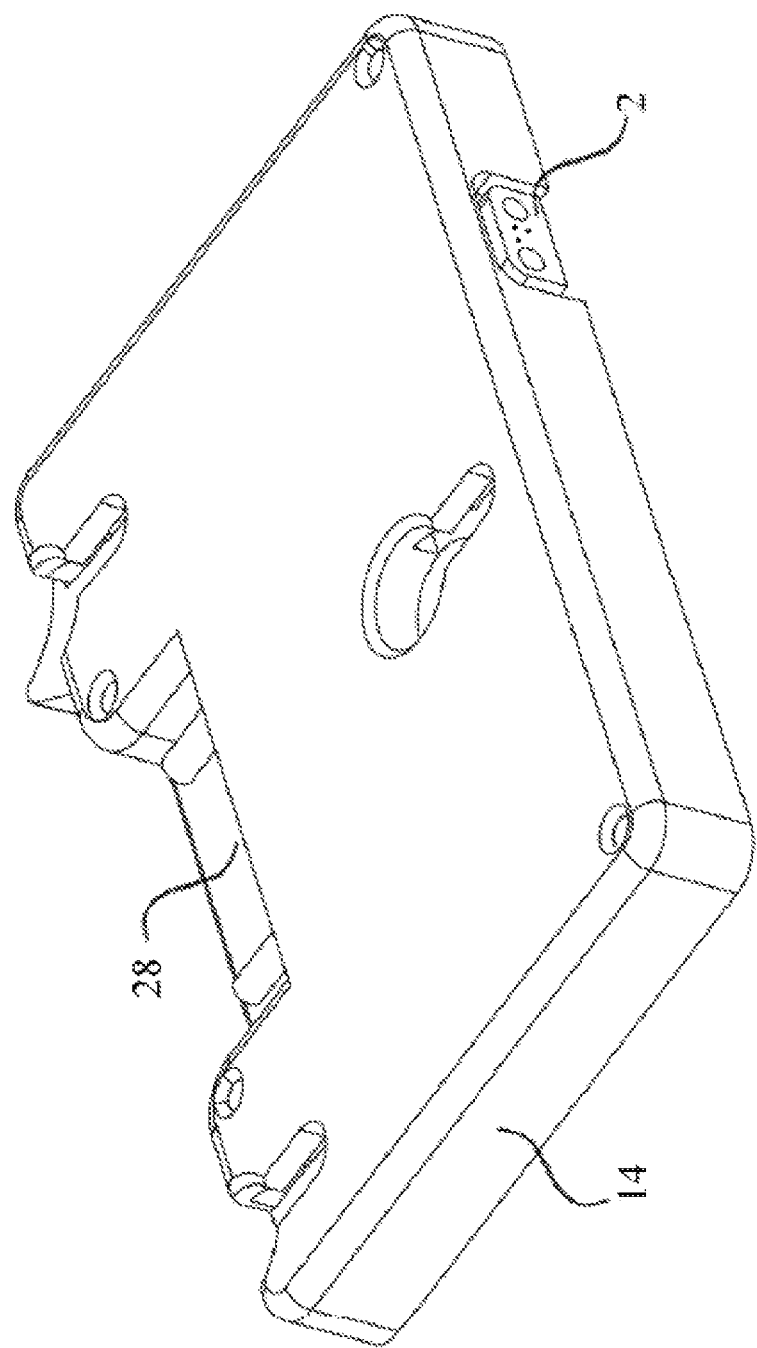
FIG. 5 is an isometric view of a conventional 3-stud attachment plate, but which has a powertap port assembly in accordance with the invention.

The powertap port 2 of the invention offers power through a positive and negative pin 24 on the powertap connector assembly of FIG. 2 and a corresponding receptacle 22 on the powertap port of FIG. 3 on the battery, through the v-mount attachment plate 12 of FIG. 4 for the battery pack, or through the 3-stud attachment plate 14 of FIG. 5 for the battery pack. The powertap port 2 can therefore be used to provide power for various accessory devices, which are preferably devices supporting the production. The primary device such as a camera, camcorder and/or video recorder 48, as depicted in FIG. 6, is powered through the main power output port 4 of FIG. 1A on the battery pack 60.

Figure 7:
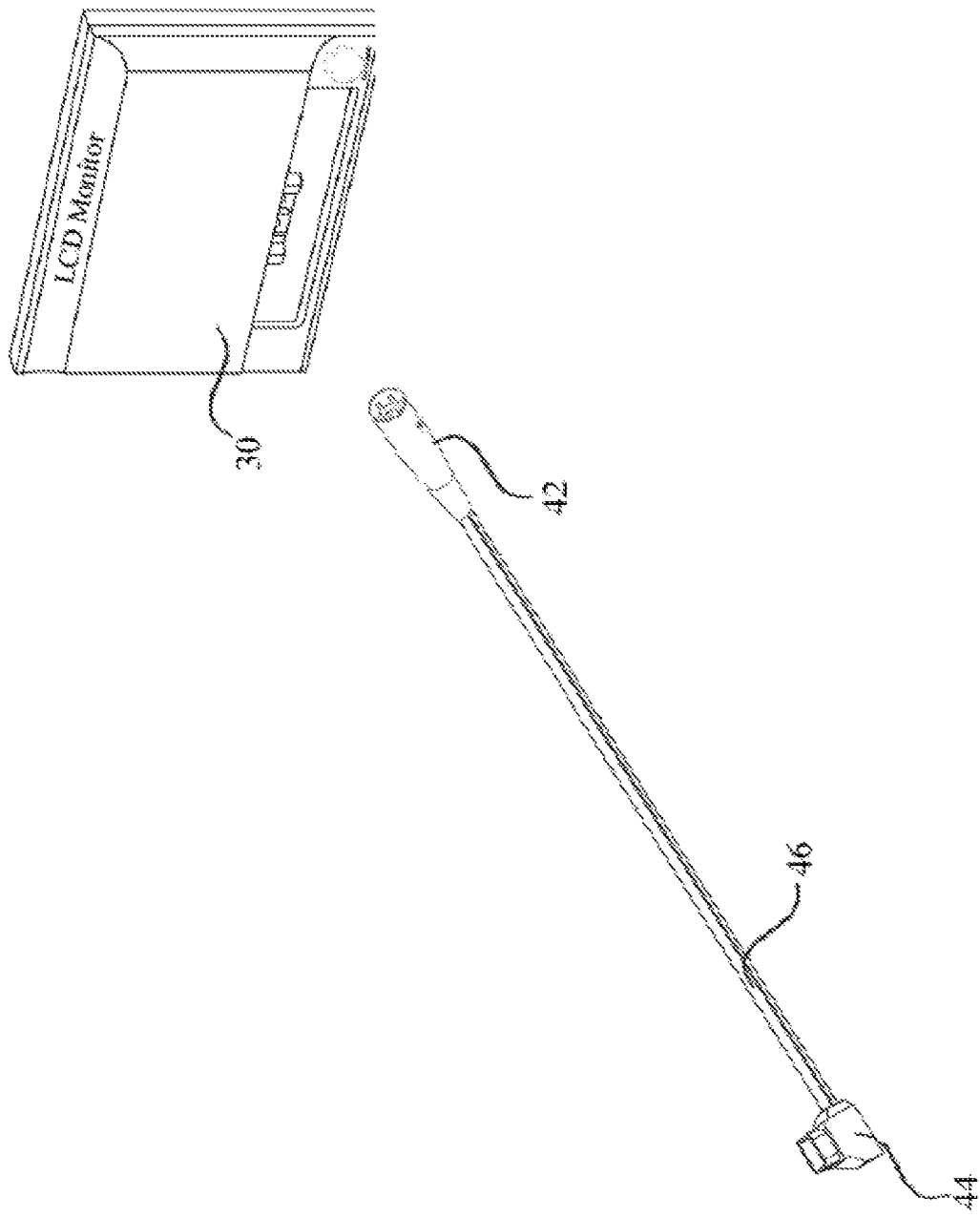
FIG. 7 is a perspective view of a powertap cable assembly and accessory or production supporting device.

The powering of accessory devices is accomplished through a powertap cable assembly 46 shown in FIG. 7. One end of the cable assembly 46 connects or plugs into the powertap port 2 of FIGS. 1B, 4 and 5, via a mating powertap connector 44 shown in FIGS. 2 and 7. Turning to FIG. 7, the opposing end of the powertap cable assembly 46 connects or plugs into the accessory or production supporting device 30 through the same or similar electrical connector 42 which connector includes, but is not limited to an XLR, LEMO, camcorder battery paddle, etc.

This main power output port 4 can be a 5-pin "block" of FIG. 1A on a v-mount battery pack or a multiple pin output port 10 on 3-stud battery pack of FIG. 8. The main power output port 4 for smart battery packs in v-mount and 3-stud configurations transmit power over two conductors 6 and transmit battery data over another pin or pins 8. The battery data can be communicated via a microprocessor that implements conventional data transmission standards via i2c/SMBUS or a single-line communication protocol like HDQ. Such communication is not, however, in any way to be construed as limited to any particular standard in accordance with the invention.

Figure 6:
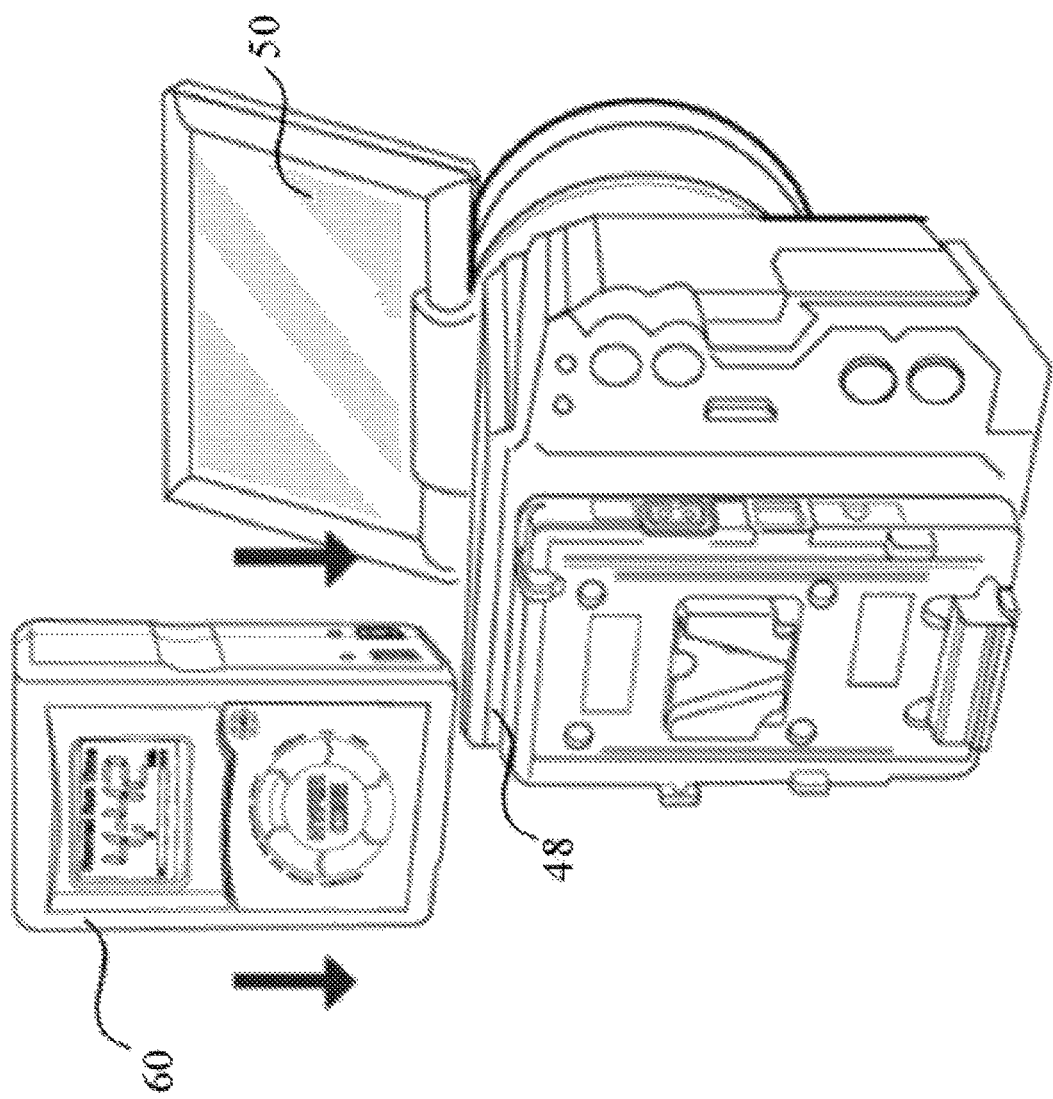
FIG. 6 is a perspective view of a primary device and associated monitor.

Mechanically, at present, the primary device 48 shown in FIG. 6 must be large enough to have a v-mount attachment plate 12 of FIG. 4 or a 3-stud attachment plate 14 of FIG. 5 mounted to the device to allow direct mounting of the v-mount or 3-stud battery pack as applicable to connect to the main power output port 4 of FIG. 1A or multiple pin output port 10 of FIG. 8. Along with power, the battery data is then conveyed to capable receiving primary devices 48 and displayed on the primary device's liquid crystal display LCD 50 or electronic viewfinder EVF 50 to advise the device operator of the remaining battery capacity percentage or runtime in hours and minutes available until the battery needs to be exchanged or recharged. FIG. 6. Other attributes of the battery may be communicated as well.

Figure 9:
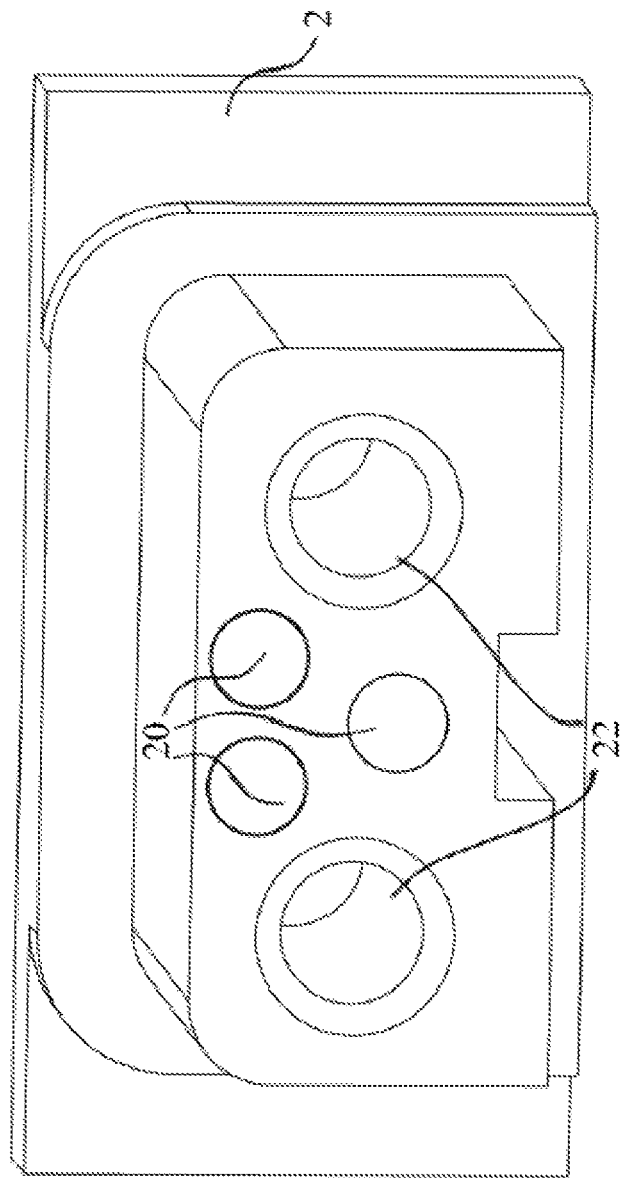
FIG. 9 is a perspective view of a powertap port assembly supporting data transmission.

As stated above and as shown in FIGS. 1B and 8, the invention preferably includes the utilization of the powertap port 2 and USB port 32 of FIGS. 1B and 8 on a battery pack 60 used in video production, but modified to support data transmission signals. FIGS. 3 and 9 show two examples of auxiliary powertap output port 2 assemblies in accordance with the invention that also support data transmission signals. For the ptap port 2, the data transmission signals will be data output from at least one battery of the battery pack.

Figure 10:
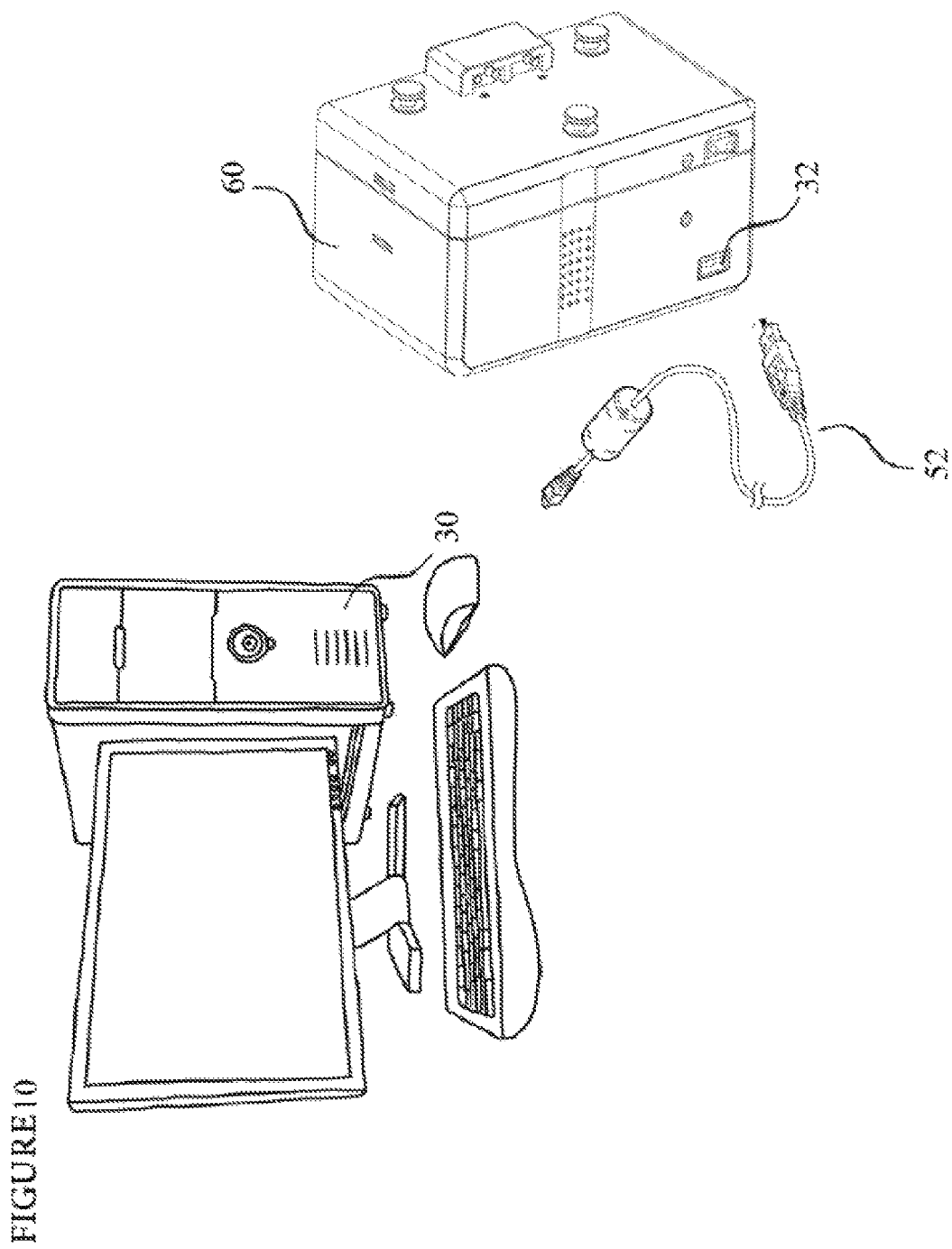
FIG. 10 is a perspective view of the 3-stud battery pack of FIG. 7 equipped with a USB port and of an accessory device as well as a connection cable that is configured to make connection between the USB port with a port in the accessory device.

For the auxiliary USB port 32 of FIGS. 1B, 8 and 10, the data signal can be both input to the battery or primary device, i.e., from the accessory device and output from the battery to the primary or the accessory device 30 over a USB connector cable 52 (see FIG. 10). Turning to FIGS. 7 and 10, data displayed on the accessory or supporting devices 30 may likewise be available to the camera operator, which may be useful to the operator for the given production. The data could include battery health and performance, date, firmware version, etc.

In the preferred embodiment depicted in FIGS. 2, 3, 9 and 11, the power tap port 2 and connector 44, which may be called a "SmartTap" port and connector, offer smart battery data through additional connections. These connections could be spring pins 16, leafs 18 or other electrical connector devices. Through these additional connections, the SmartTap port and connector 44 receives and transfers data, via the cable harness 46, to then be articulated by accessory or supporting devices 30, including, but not limited to, an external LCD or EVF (see FIG. 7).

Figure 11:
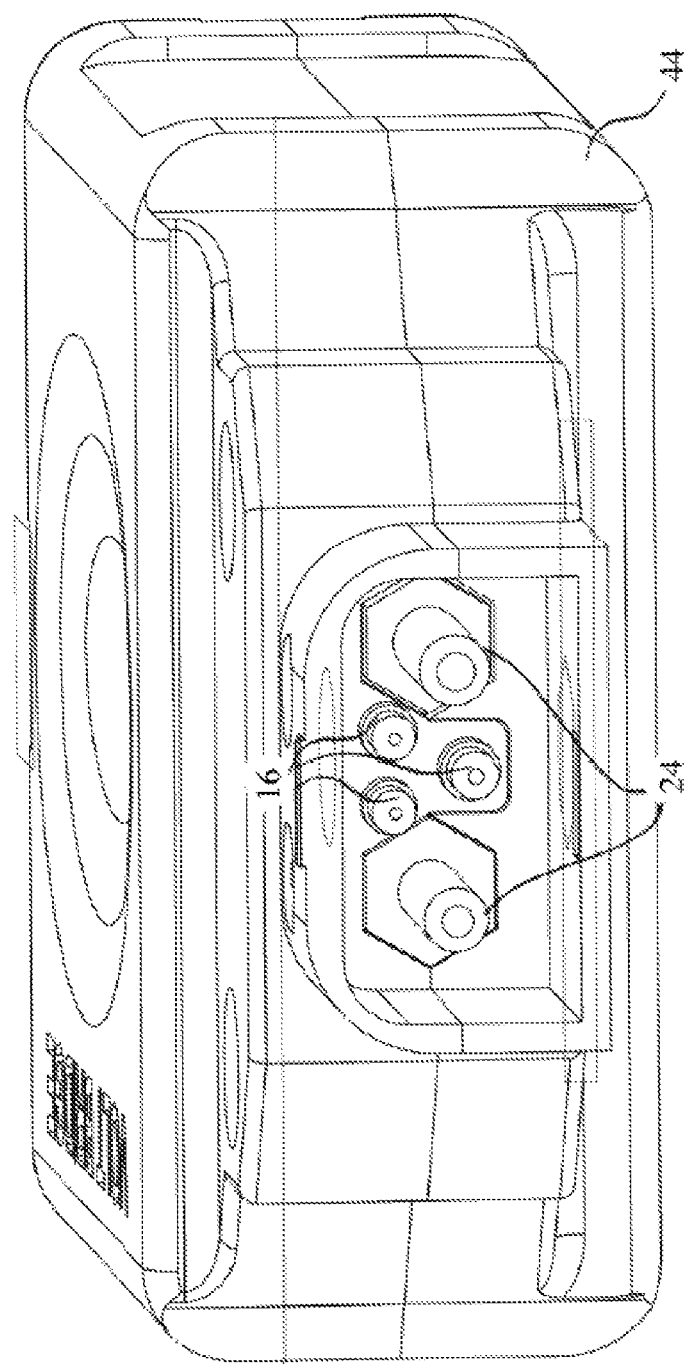
FIG. 11 is a perspective view of a powertap port assembly with wireless battery monitoring system transmitter.

In yet another embodiment of the present invention, the data could also be received by a wireless battery monitoring system transmitter, such as that depicted in FIG. 11.

In another application of the preferred embodiments depicted in FIGS. 4 and 5, respectively, the "SmartTap" or ptap port 2 is part of a v-mount attachment plate 12 or 3-stud battery attachment plate 14. The battery attachment plates 12 or 14 are to be connected to the smart battery pack 60 of FIGS. 1 and 8. The "SmartTap" or ptap port 2 on the battery attachment plates 12 or 14 of FIGS. 4 and 5 is wired to transfer battery power to the attachment plate ptap port through a positive and negative receptacle 22 of FIG. 3. The battery attachment plate 12 or 14 of FIG. 4 or 5 (as applicable) has the ability to receive battery data through, as applicable, the v-mount main 26 of FIG. 4 or the 3-stud main 28 input connections of FIG. 5. The data terminals can be wired to the SmartTap port or ptap port 2 so that data is transmitted as well as power.

Figure 12:
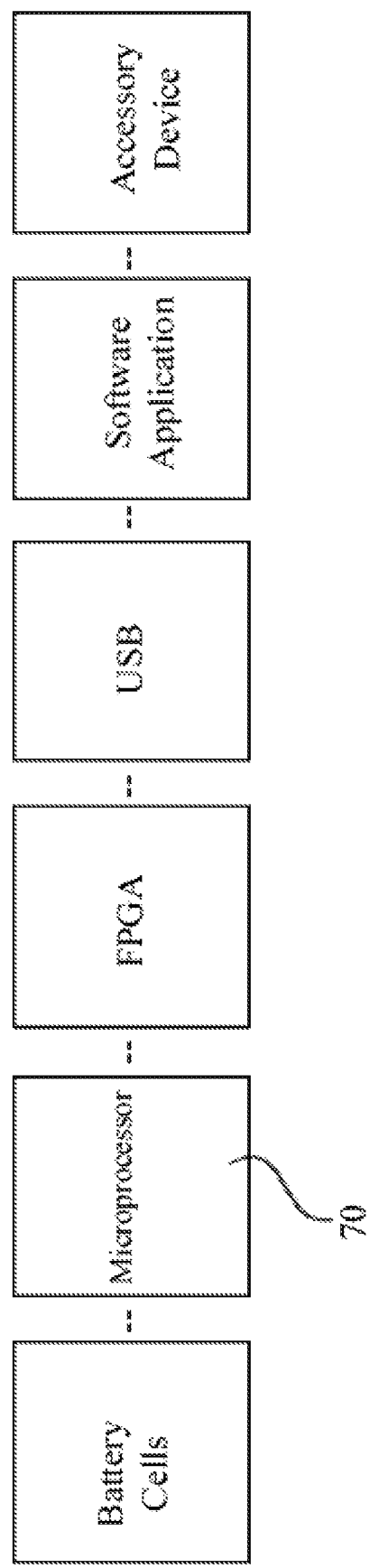
FIG. 12 is a linear box diagram of an interface between the USB port of the battery pack and the microprocessor.

In yet another embodiment of this invention depicted in FIG. 10, the USB port 32 on a smart battery pack 60 would not only provide for power transmission as in the current state of the art, but will have data transmission capabilities. The USB port 32 would connect and/or synchronize with the microprocessor 70 in the battery pack 60 through a conventional method to establish an interface or connection. For example, as shown in FIG. 12, such an interface or connection can be established through an FPGA Field Programmable Gate Array or by coupling the microprocessor with a USB transceiver, USB serial interface engine and serial peripheral interface slave that can run with a serial clock signal. In this way, through an interface directly linked to the microprocessor 70, external access to the microprocessor is provided.

This is an improvement over board level programming required at present. Board level programming requires opening the battery pack to ascertain the attributes of the battery pack. This can only be done by an authorized service center.

As shown in FIGS. 10 and 12, the primary device user is provided with access to the microprocessor 70 in the battery pack 60 through the external USB port 32. The data capabilities provided by the interface allows data transmission both from, and to, the microprocessor 70 in the battery pack 60, through a software application on a accessory device 30, which may be a computing device, via a standard USB cable 52. In addition, this feature allows the downloading of the battery pack 60 data stored in the microprocessor 70 through a support or accessory device that is a computing device 30. And still further, this feature allows for the uploading of new firmware to the battery pack 60 via an accessory device 30.

One of ordinary skill in the art would recognize several other capabilities and embodiments of the present invention. Where a primary device 48 of FIG. 6 mechanically cannot connect to the main power output port 4 of FIG. 1A or output port 10 of FIG. 8, it can be connected to the auxiliary ports, such as Smarttap port 2 and USB port 32 of FIG. 1B or FIG. 8 and FIG. 10 provided in this invention and data from the battery pack 60 will be transmitted to the primary device. When utilizing the USB port 32 of FIG. 10 as the auxiliary port, the data transmission can be both input and output between the battery pack 60 of FIGS. 1 and 8 and the connected devices 30 of FIG. 10 and 48 of FIG. 6, This allows battery pack data to be communicated to, and displayed by, any supporting or accessory device 30 and 48 connected to the auxiliary ports, i.e, Smarttap port 2, and USB port Smarttap 2. It also allows an exchange of data, via the battery pack 60, between accessory or supporting devices 30 and the primary devices 48 via the battery pack 60.

It should be understood that the disclosed invention may include auxiliary ports other than the powertap ports described above. In other embodiments, the auxiliary port of a smart battery pack or battery mount plate may transmit power and data using other methods and other connectivity. For example, it is possible for data to be transmitting over the same lines, cables or contacts used for power to be transmitted.

Figure 13:
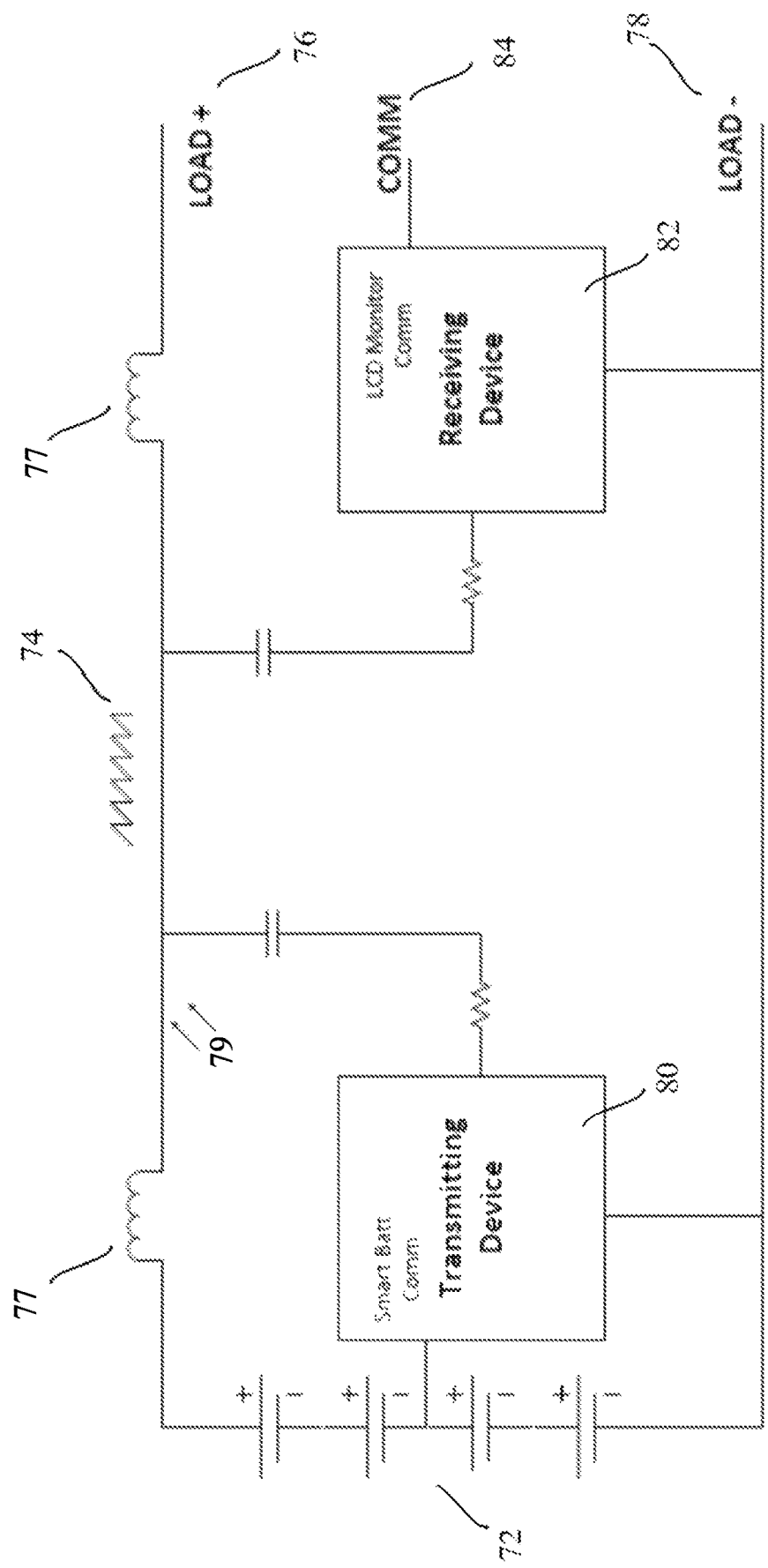
FIG. 13 is a block diagram in which a transmitting device and a receiving device utilize a common printed circuit board.

For example, FIG. 13 illustrates a method of sending smart battery data from an auxiliary port of a smart battery pack 72 or battery mount plate. In this method, the data is received from the battery pack and then superimposed 74 on the power line of the auxiliary port. The benefit is that only two conductors, Load+ 76 and Load− 78, are necessary for data transmission. The smart battery data is encoded via a transmitting circuit 80, and the data is superimposed on the power line. The receiving device 82 will have a similar circuit that decodes and separates the data communication 84 from the power. The receiving device will then interpolate the data as necessary while being powered.

Data is received via a connection to the battery data terminals. This can be from the auxiliary port, or direct from the microprocessor. The data type can be SMBus, HDQ, or other single-line communications. Because of powering (and sending data to) video production devices, which are susceptible to noise/interference (monitors, wireless video transmitters, cameras), a fairly high carrier frequency (1-2 Mhz) is used with an on/off keying scheme so there will be very low radiated emissions. The carrier frequency and data bit rates will be outside the common LCD monitor refresh rates. In addition, the inductors isolate the noise.

The reason that only two conductors are necessary for data transmission is for the same reason that many professional video devices only have power inputs with two conductors/terminals. That is, it was thought, prior to the present invention, that only power would be received through a positive and negative terminal. This invention is more beneficial, because now through the same two terminals, the device can be powered, as well as receive battery data, presumably during, but not limited to, actual calculated remaining operating time.

The manner that the smart battery data is encoded and superimposed onto the power line by the transmitting circuit is carried out in a conventional manner through, for instance, a Texas Instrument integrated, powerline communications (PLC) analog front-end (AFE) integrated microprocessor.

The receiving device has identical printed circuit board (pcb) circuitry to extract the Smart Batt data from the DC Power line on the transceiver using a simple full duplex UART interface and implements a firmware instruction set to communicate through the UART to request the necessary information desired. The 100 uH inductors are required on the encoding and decoding ends of the DC power line to isolate and attenuate the communication signals riding on power line to reduce the chance of noise/interference.

The smart battery communication transmitting device 80 would be designed PCB transceiver programmed with the transmitting/encoding firmware. The LCD monitor communication receiving device 82 is preferably the same designed PCB transceiver programmed with the receiving/decoding firmware. The loads 76+, 78− are resistors within the transmitting circuit 80 and receiving device 82 respectively. The reason why the inductor is mentioned is because, while the inductor can be board mounted, it is technically not part of the transceiver circuit design, but external to. An electrical conductor may be copper wiring.

Figure 14:
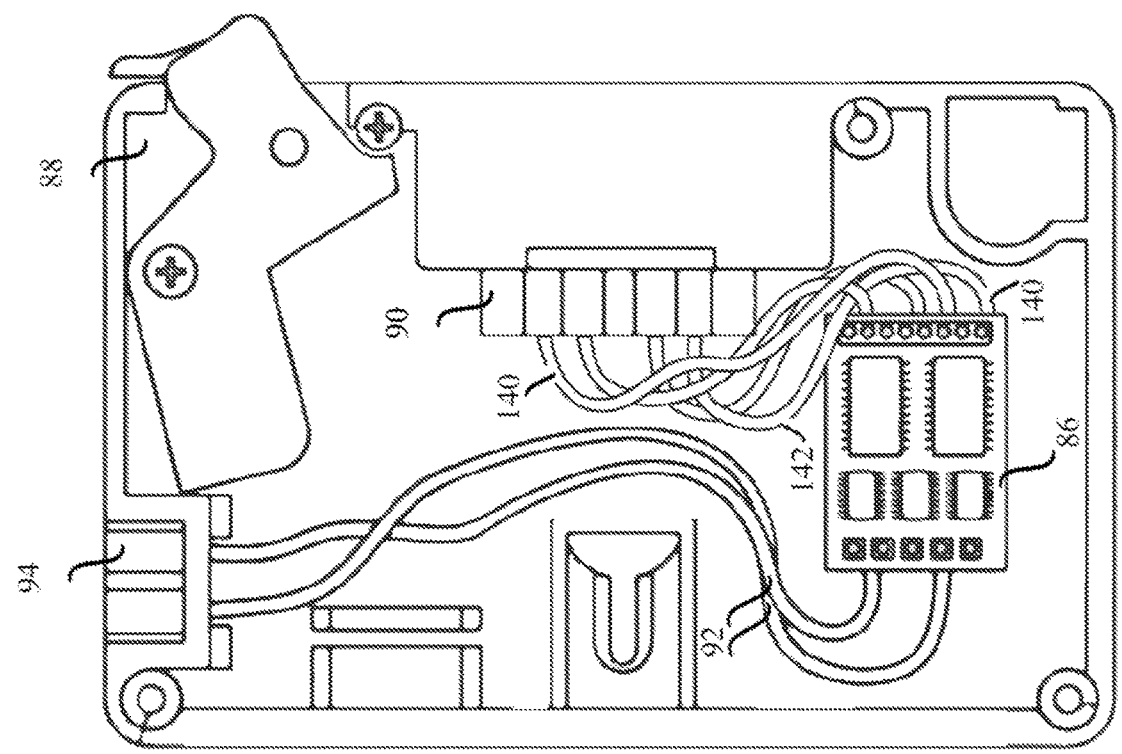
FIG. 14 is a rear view of a conventional 3-stud mount plate, but with an encoding printed circuit board installed in a conventional, professional video battery mount plate.

In the audio-visual recording industry, typical mounting plates or brackets include 3 stud and V-mount plates. Printed circuit boards for use in professional video recording productions are installed in these mounting plates and are powered by the associated smart battery and communicate data to the primary and secondary devices associated with the smart battery. FIG. 14 illustrates the rear side of a conventional 3-stud Mount plate 88, with an encoding printed circuit board 86 installed in a conventional, professional video battery mount plate. This encoding printed circuit board 86 could also be installed in a conventional v-mount plate. The mount plates' connector terminal block 90 makes a connection with the mounted smart battery pack to receive power and battery data. Two connections on the terminal are dedicated to power, while battery data may be one or two connections, depending on the communication level of the connected smart battery pack. The circuit board 86 receives power and data, and encodes the data onto to power lines, reducing the number of outputs to two lines 92 exiting the circuit board, and then wired to the auxiliary port 94 on the battery mount plate.

Figure 15:
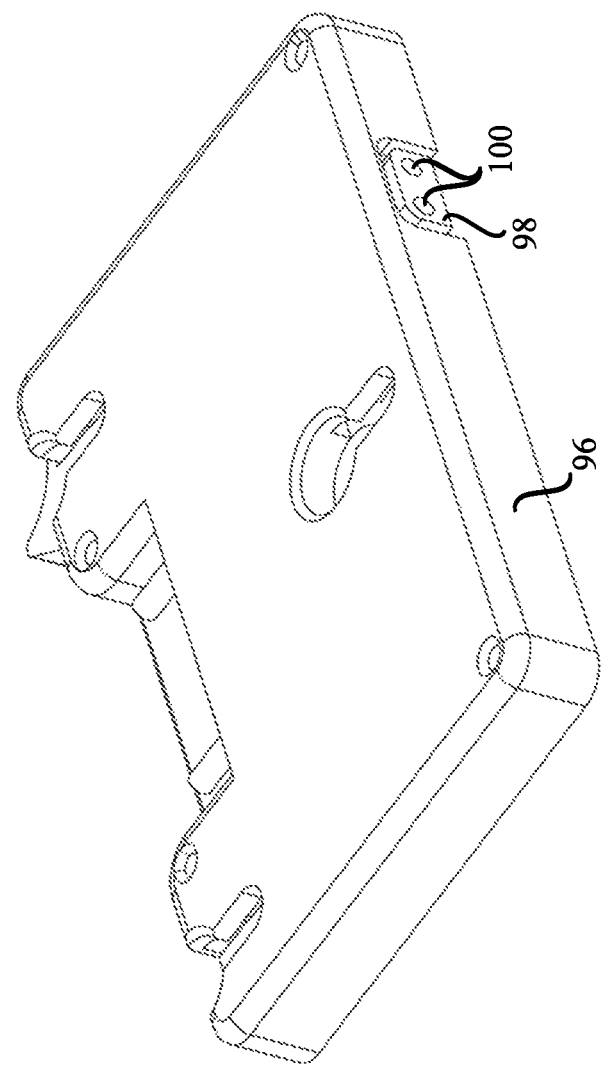
FIG. 15 is a front view of the conventional 3-stud mount plate of FIG. 36.

FIG. 15 illustrates the front side of the conventional 3-Stud Mount 96, but with the encoding circuit board installed. The auxiliary port 98, in this case a powertap, only requires two conductors 100, as opposed to FIG. 5 which shows an installed powertap with additional data pins, represented in FIG. 9.

Figure 16:
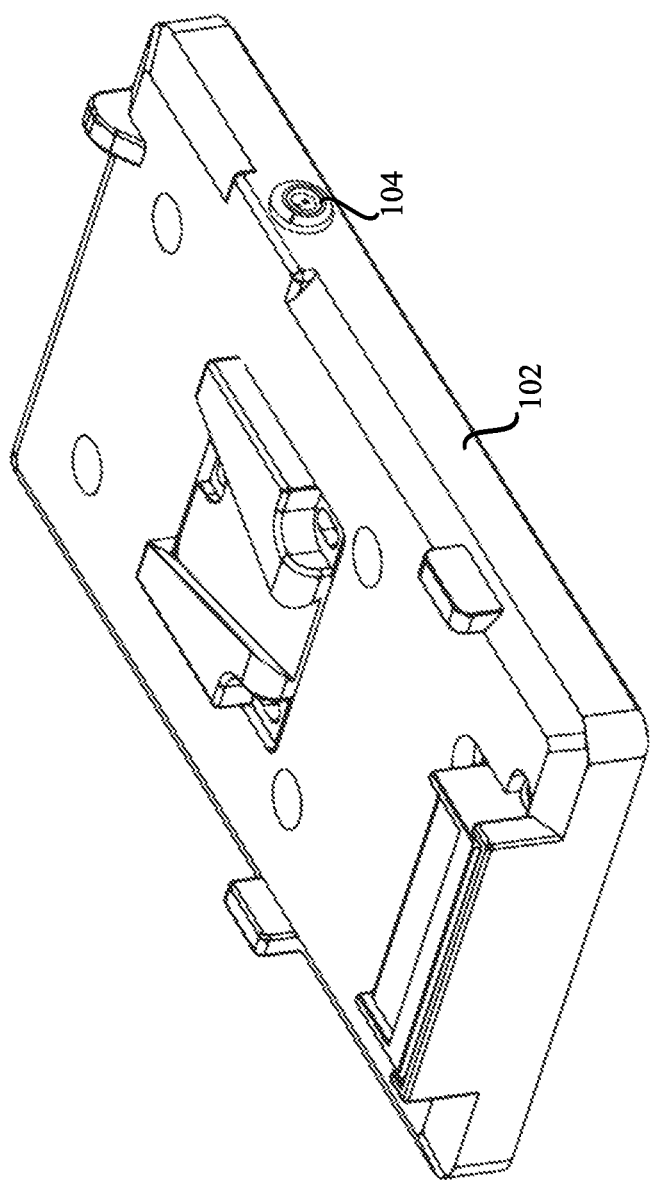
FIG. 16 a front view of a conventional V-mount battery attachment plate, but with a LEMO type auxiliary port 104 with two conductors.

FIG. 16 shows a front side of a conventional V-mount battery attachment plate 102, but with a LEMO type auxiliary port 104 with two conductors in accordance with the invention. This shows that the auxiliary port could be a different type of connector, and not only a power tap.

Figure 17:
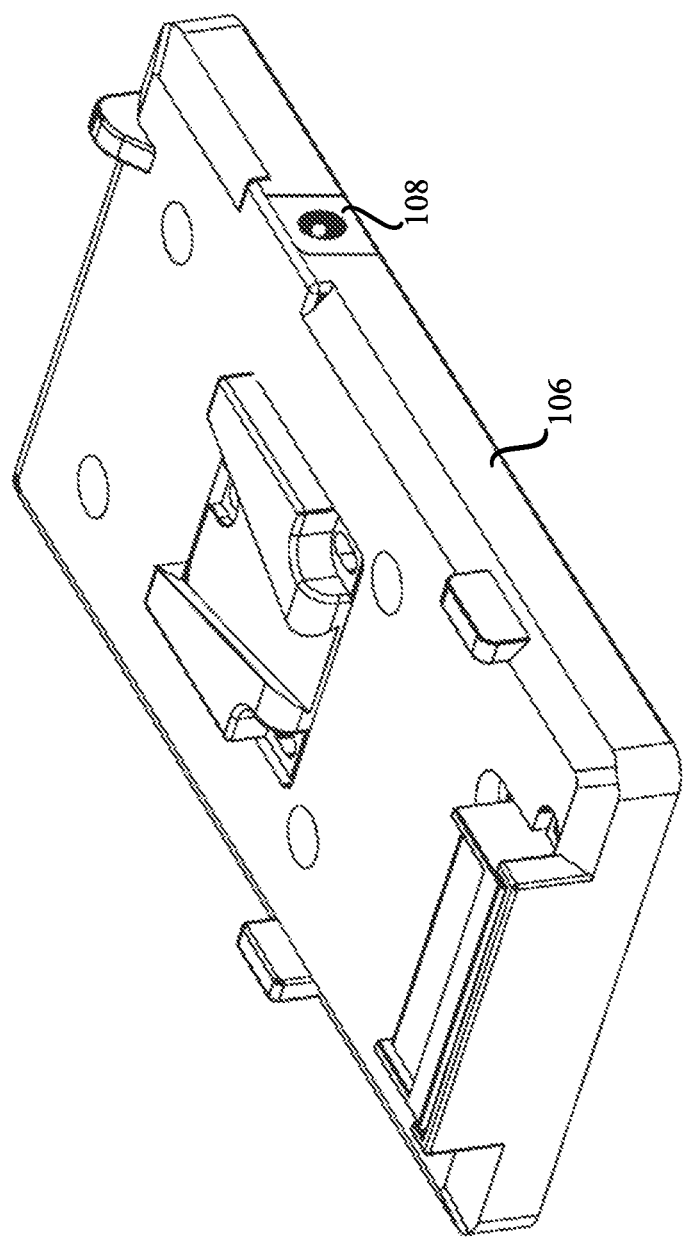
FIG. 17 is a front view of a conventional V-mount battery attachment plate, but with yet another auxiliary port option, that being a DC barrel pin type.

FIG. 17 shows a front side of a conventional V-mount battery attachment plate 106 with yet another auxiliary port option in accordance with the invention, that being a DC barrel pin type 108.

Figure 18:
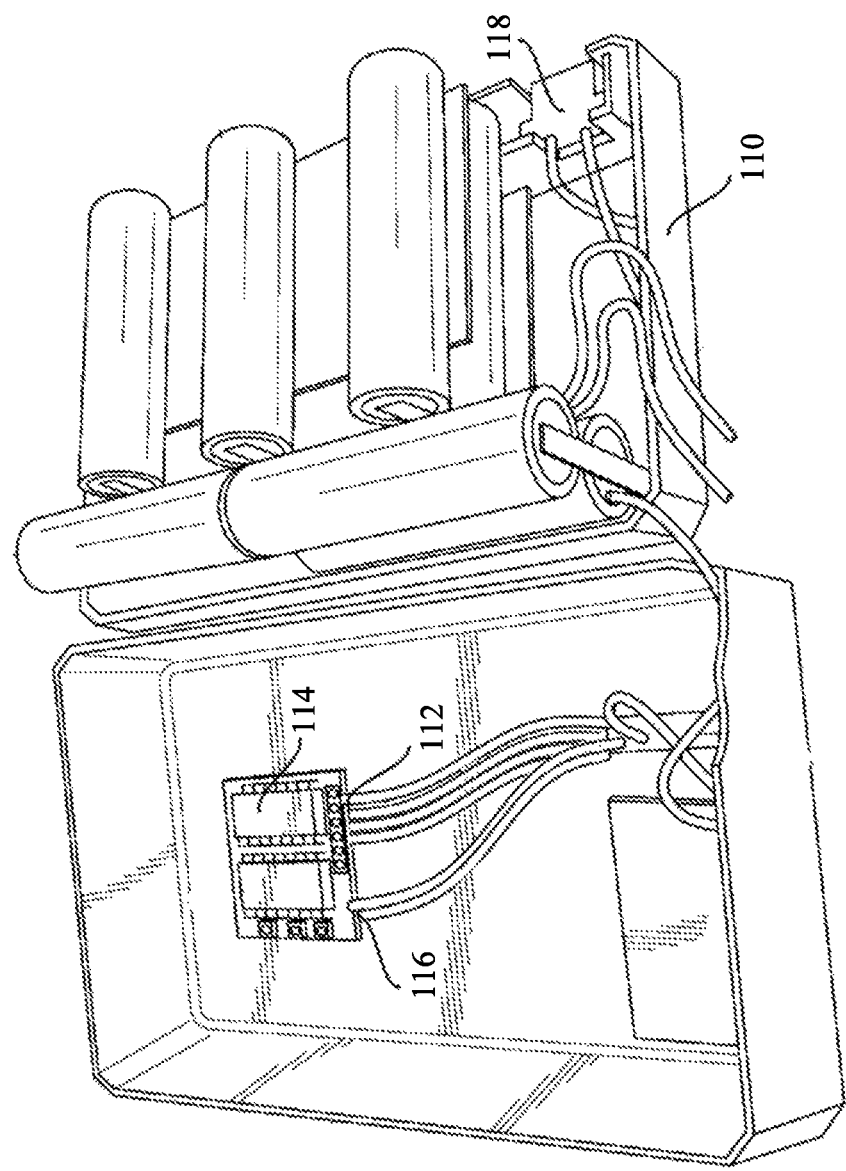
FIG. 18 is an open view of the smart battery pack to reveal the encoding circuit board placed within.

FIG. 18 illustrates the encoding circuit board being placed within the smart battery pack 110. The smart battery data and power connections are wired to the input 112 of the encoding circuit board 114, and the two outputs 116 are connected to the auxiliary output 118, in this case a powertap.

Figure 19:
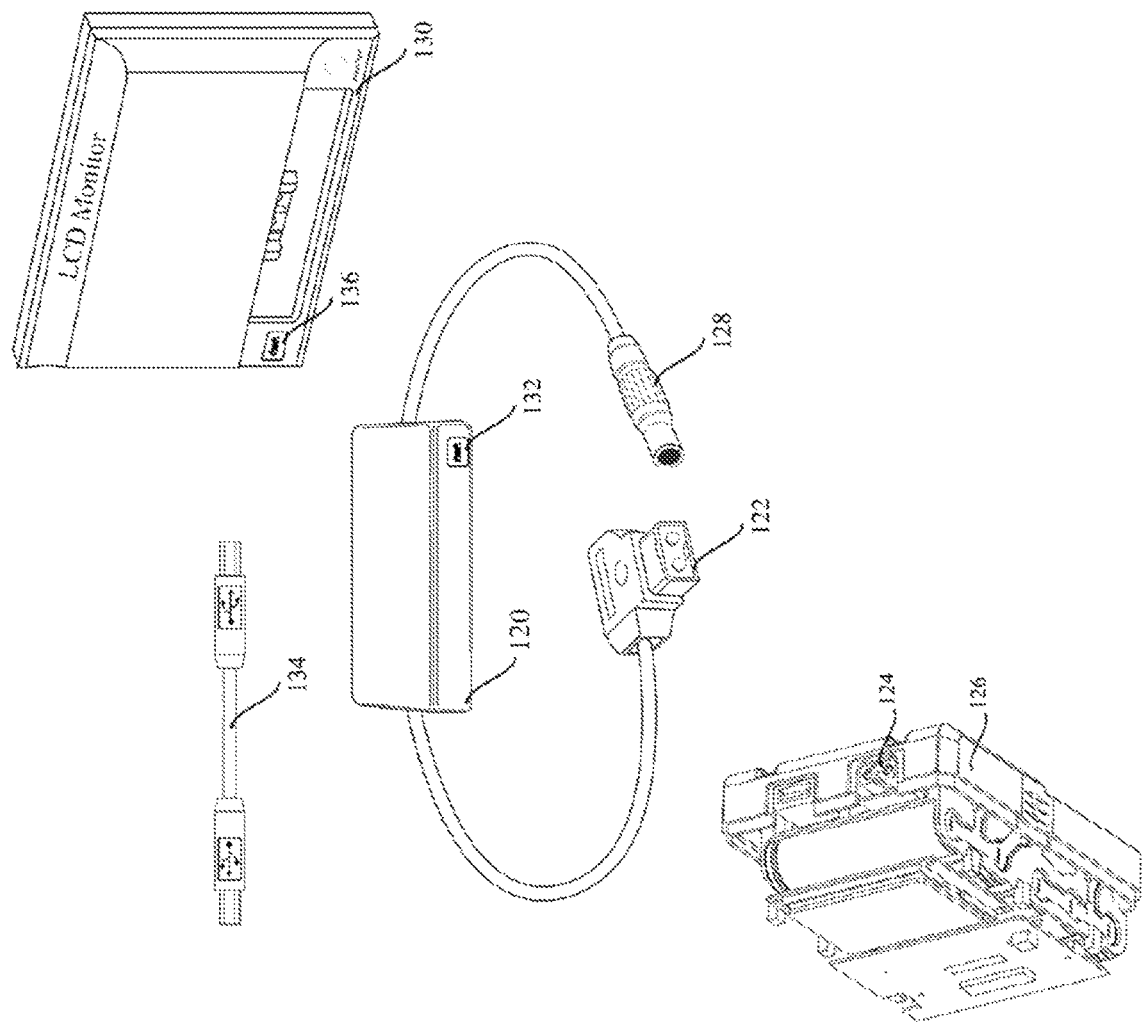
FIG. 19 is an exploded view showing a cable assembly with inline encoding circuit board housed in an enclosure in relation to a smart battery pack and receiving device for connection thereto and in relation to an auxiliary cable for connection to the receiving device.

FIG. 19 shows a cable assembly with inline encoding circuit board housed in an enclosure 120. In this illustration, the power tap connector 122 receives both power and data from the power tap auxiliary port 124 of the smart battery pack 126. The output of the encoding circuit board is then terminated with an LEMO type auxiliary port connector 128. The LEMO connector would then plug into a receiving device 130 which would have decoding board installed. Should the receiving device not have the decoding board installed, a USB connection 132 on the circuit board and circuit board enclosure is provided to connect an additional cable 134 to the receiving device's USB port 136 for data transmission.

While the foregoing description and drawings represent the preferred embodiments of the present invention, it will be understood that various changes and modifications may be made without departing from the scope of the present invention.

What is claimed is:

1. An apparatus for data communication on auxiliary ports on a smart battery pack, comprising:
    video production equipment that includes at least one accessory device;
    at least one smart battery pack for video production equipment equipped with a main power port that provides power and data communication upon making connection via at least one mating attachment plate, the at least one smart battery pack also being equipped with at least one auxiliary port that provides power and data communication between the at least one accessory device and the at least one smart battery pack, wherein at least one smart battery pack is selected from the group consisting of a v-mount battery pack, a 3-stud battery pack and a smaller camcorder battery pack.

2. The apparatus of claim 1, further comprising:
    monitoring means for monitoring remaining runtime of the at least one smart battery pack and for establishing the data communication between the at least one smart battery pack and the at least one accessory device even if the at least one accessory device is incompatible for mounting directly to the at least one mounting plate.

3. The apparatus of claim 1, wherein the at least one auxiliary port includes at least one powertap or ptap port configured to provide smart battery data from the smart battery pack to the at least one accessory device even though the at least one accessory device is incompatible for mounting directly to the at least one mounting plate, the monitoring means includes a transmitter that establishes the data communication wirelessly, the transmitter being associated with the at least one smart battery pack.

4. The apparatus of claim 3, further comprising:
    electrical connector devices through which is provided the smart battery data, the at least one powertap or ptap port having the electrical connector devices and having at least one mating data receiver pad that mounts to at least one mating cable-mounted connector to receive and transfer data via a cable harness, the electrical connector devices being selected from the group consisting of spring pins and leafs.

5. The apparatus of claim 1, further comprising:
    the at least one mating attachment plate, which has at least one powertap or ptap port that is configured to transfer battery power to a powertap port plate through a positive and negative receptacle and that is wired to data terminals of the at least one mating attachment plate.

6. The apparatus of claim 1, wherein the at least one smart battery pack is also equipped with a USB port configured to provide power to accessory devices, the USB port also being configured to provide data communication to, and to synchronize with, a microprocessor of the at least one smart battery pack.

7. The apparatus of claim 1, wherein the at least one smart battery pack is also equipped with a USB port configured to provide power to the at least one accessory device, the USB port also being configured to provide data communication to and from a microprocessor of the at least one smart battery pack through a software application on a computing device via a USB cable and to enable downloading of data stored in the microprocessor through the at least one accessory device that is a computing device and uploading of firmware to the at least one smart battery pack via the computing device.

8. The apparatus of claim 1, wherein the at least one accessory device is selected from the group consisting of on-camera lighting, high definition video HDV camcorder, digital single lens reflex DSLR cameras, on-camera monitors, and on-camera viewfinders.

9. The apparatus of claim 1, further comprising:
    means for superimposing the data communication with the power through the at least one auxiliary port.

10. The apparatus of claim 1, further comprising:
    a receiving device having a power port, a power line connecting the power port with the at least one auxiliary port, the at least one smart battery pack being equipped with circuitry to encode the data communication so as to superimpose same with the power via the power line, the receiving device being equipped with circuitry to decode the encoded data communication, the receiving device having a USB port through which the decoded data communication passes via a USB cable to at least one accessory device.

11. A method for making data communication on auxiliary ports on a smart battery pack, comprising:
providing video production equipment that includes at least one accessory device;
equipping at least one smart battery pack with a main power port that provides power and data communication upon making connection via at least one mating attachment plate;
equipping the at least one smart battery pack also with at least one auxiliary port that provides power and data communication to the at least one accessory device; and
selecting the at least one smart battery pack from the group consisting of a v-mount battery pack, a 3-stud battery pack and a smaller camcorder battery pack.

12. The method of claim 11, further comprising:
monitoring remaining runtime of the at least one smart battery pack and for establishing the data communication between the at least one smart battery pack and at least one auxiliary device even if the at least one accessory device is incompatible for mounting directly to the at least one mounting plate; and
transmitting with a transmitter that establishes the data communication wirelessly, the transmitter being with the at least one smart battery pack.

13. The method of claim 11, wherein the at least one auxiliary port includes at least one powertap or ptap port that provides smart battery data to the at least one accessory device even if the at least one accessory device is incompatible for mounting directly to the at least one mounting plate.

14. The method of claim 13, further comprising:
providing the smart battery data through electrical connector devices, the at least one powertap or ptap port having the electrical connector devices and having at least one mating data receiver pad that mounts to at least one mating cable-mounted connector to receive and transfer data via a cable harness.

15. The method of claim 14, further comprising:
equipping the battery pack with a USB port that provides power to accessory devices, the USB port also providing data communication through connection via a field programmable gate array and to synchronize with a microprocessor of the at least one smart battery pack.

16. The method of claim 11, further comprising:
equipping the battery pack with a USB port that provides power to the at least one accessory device, the USB port also providing data communication to and from a microprocessor of the at least one smart battery pack through a software application on the at least one accessory device via a USB cable and to enable downloading of data stored in the microprocessor through the at least one accessory device that is a computing device and uploading of firmware to the at least one smart battery pack via the accessory device.

17. The method of claim 11, further comprising:
establishing data communication between a primary device and the battery pack via the at least one auxiliary port, the primary device being configured to be incompatible for mounting directly to the at least one mating attachment plate.

18. The method of claim 11, further comprising:
superimposing the data communication with the power through the at least one auxiliary port.

19. The method of claim 11, further comprising:
connecting a power port of a receiving device with the at least one auxiliary port;
equipping the at least one smart battery pack with circuitry to encode the data communication so as to superimpose same with the power via a power line; and
equipping the receiving device with circuitry to decode the encoded data communication, the receiving device having a USB port through which the decoded data communication passes via a USB cable to at least one accessory device.

* * * * *